No. 827,084. PATENTED JULY 31, 1906.
J. A. COYNER.
COLLAR FASTENER.
APPLICATION FILED APR. 4, 1905.
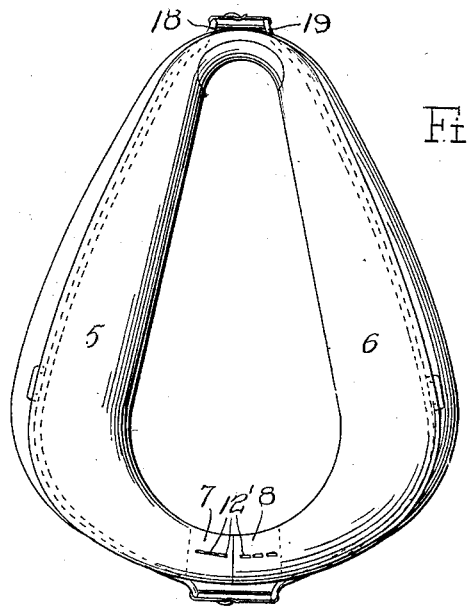
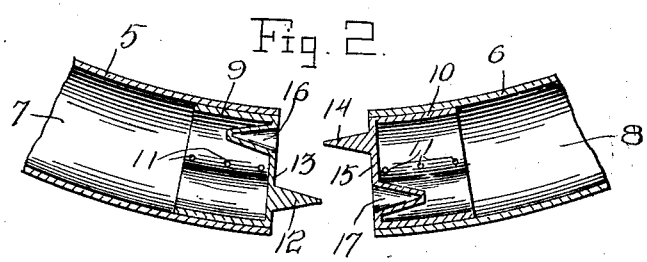
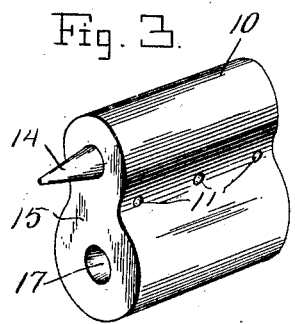

UNITED STATES PATENT OFFICE.

JOHN A. COYNER, OF AUSTIN, OHIO.

COLLAR-FASTENER.

No. 827,084.　　　Specification of Letters Patent.　　　Patented July 31, 1906.

Application filed April 4, 1905. Serial No. 253,842.

*To all whom it may concern:*

Be it known that I, JOHN A. COYNER, a citizen of the United States, residing at Austin, in the county of Ross, State of Ohio, have invented certain new and useful Improvements in Collar-Fasteners; and I do hereby declare the following to be a full, clear, and exact description of the invention, such as will enable others skilled in the art to which it appertains to make and use the same.

This invention relates to horse-collars; and it has for its object to provide an improved construction of collar divided at the bottom, so that the lower resultant ends may be swung apart to permit the collar to be slipped readily over the head of a horse, the ends of the collar being provided with means for holding them against lateral displacement when brought together.

A further object of the invention is to provide a specific construction of coupling for the ends of the collar wherein the coupling members will be held in engaging positions so long as the hames are in place, but when the hames are removed the coupling members may be drawn apart.

A further object of the invention is to provide a construction which will have all of the strength of the usual collar, while its cost will not be materially increased.

In the drawings forming a portion of this specification, and in which like numerals of reference indicate similar parts in the several views, Figure 1 is an elevation showing a collar embodying the present invention. Fig. 2 is a vertical section taken longitudinally through the lower end portions of the collar with the coupling members therein. Fig. 3 is a detail perspective view of one of the coupling members.

Referring now to the drawings, there is shown a collar comprising the usual shell of leather or other material having a suitable resilient filling, the collar having the usual general shape, but being divided transversely at its lowermost point to form the side members 5 and 6. The division of the collar is formed through what may be termed the "bottom" of the collar, which includes the two end portions 7 and 8, that are designed to abut when the collar is in normal or working position.

In each end 7 and 8 of the collar is disposed a metallic bushing, (shown at 9 and 10, respectively,) these bushings being fitted inside of the leather shell of the collar and conforming thereto in contour. The sides of each of the bushings are provided with perforations 11, designed to receive stitches 12' or other means for holding the bushings within the shell of the collar. The bushing 9 has a tapered stud 12 projecting from the lower portion of its free end 13, while the bushing 10 has a tapered stud 14, that projects from its free end 15. The bushings are closed at their outer or free ends, and the bushing 9 has a socket 16 in the upper portion of its end face which is tapered to snugly receive the stud 14, while the bushing 10 has a tapered socket 17 in the lower portion of its end face to receive the tapered stud 12. When the studs are snugly engaged with the corresponding sockets, the end faces 13 and 15 are in mutual contact and the collar is in position for use.

To hold the end faces 13 and 15 in mutual contact or abutting, the hames 18 and 19 are applied in the usual manner, the hames holding the ends 7 and 8 against separation by movement away from each other in the plane of the collar, while the coupling members hold the ends against displacement with respect to each other in all lateral directions.

In the manufacture of the collar the bushings are placed in the end portions 7 and 8 and the collar is stuffed from its top, and it will be noted that the socket portions 16 and 17 are reëntrant and give continuous bearing-surfaces to the studs 12 and 14, so that not only is a rigid structure produced, but the stuffing of the collar is prevented from working out.

It will be understood that in practice modifications of the specific constructions shown may be made and any suitable materials and proportions may be used for the various parts without departing from the spirit of the invention.

What is claimed is—

1. In a collar the combination with a shell pivoted at its top to form end portions, of bushings engaged in each of said end portions, said bushings comprising each a major and a minor cylindrical portion, each of said bushings being provided with a socket and a conical stud, the conical stud on one of said bushings being adapted for engagement in the socket in the other of said bushings.

2. In a collar the combination with a shell pivoted at its top to form end portions, of bushings engaged in each of said end portions, said bushings having one of their ends closed, a portion of the closed end of each of said bushings being extended inwardly to form a conical socket and the said closed end being provided with a conical stud, said stud lying in a common vertical plane with the said socket.

In testimony whereof I affix my signature in presence of two witnesses.

JOHN A. COYNER.

Witnesses:
GEO. H. CHANDLEE,
JAS. H. BLACKWOOD.